US008768682B2

(12) United States Patent
Wu et al.

(10) Patent No.: US 8,768,682 B2
(45) Date of Patent: Jul. 1, 2014

(54) ISA BRIDGING INCLUDING SUPPORT FOR CALL TO OVERIDDING VIRTUAL FUNCTIONS

(71) Applicant: Intel Corporation, Santa Clara, CA (US)

(72) Inventors: Yong Wu, Shanghai (CN); Jianhui Li, Shanghai (CN); Xiaodong Lin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/745,203

(22) Filed: Jan. 18, 2013

(65) Prior Publication Data
US 2014/0046649 A1     Feb. 13, 2014

(30) Foreign Application Priority Data
Aug. 8, 2012   (WO) ................ PCT/CN2012/079798

(51) Int. Cl.
*G06F 9/455*       (2006.01)
*G06F 9/44*        (2006.01)

(52) U.S. Cl.
CPC ............ *G06F 9/45504* (2013.01); *G06F 9/455* (2013.01); *G06F 9/443* (2013.01)
USPC .................. 703/23; 717/136; 712/1; 712/200

(58) Field of Classification Search
None
See application file for complete search history.

(56) References Cited

U.S. PATENT DOCUMENTS

| 4,587,612 | A  | * | 5/1986 | Fisk et al. ....................... 703/26 |
| 5,297,284 | A  | * | 3/1994 | Jones et al. .................. 717/137 |
| 5,560,013 | A  | * | 9/1996 | Scalzi et al. .................. 717/138 |
| 6,182,283 | B1 | * | 1/2001 | Thomson ....................... 717/153 |
| 6,412,020 | B1 | * | 6/2002 | Leach et al. .................. 719/316 |
| 6,675,377 | B1 | * | 1/2004 | Tanaka ........................... 717/152 |
| 7,080,363 | B2 | * | 7/2006 | Yellin et al. .................. 717/139 |
| 7,103,878 | B2 | * | 9/2006 | Fahs et al. ..................... 717/130 |

(Continued)

FOREIGN PATENT DOCUMENTS

CN     102110011 A      6/2011
EP     2482184 A1       1/2012

OTHER PUBLICATIONS

International Search Report and Written Opinion, mailed Nov. 1, 2012 for PCT Application No. PCT/CN2012/0797989, 10 pages.

(Continued)

*Primary Examiner* — Omar Fernandez Rivas
*Assistant Examiner* — Kibrom Gebresilassie
(74) *Attorney, Agent, or Firm* — Schwabe, Williamson & Wyatt, P.C.

(57)   ABSTRACT

Methods, apparatuses and storage medium associated with ISA bridging with support for virtual functions, are disclosed. In embodiments, at least one computer-readable storage medium may include instructions configured to enable a target device with a target ISA, in response to execution, to provide an ISA bridging layer to the target device to facilitate a library service of a library of the target device to call a virtual function of the library, while servicing an application operating on the target device, where the application has an overriding implementation. The ISA bridging layer may include a loader configured to load the application for execution, and as part of loading the application, detect the virtual function and modify a virtual function table of the application to enable the call. Other embodiments may be disclosed or claimed.

25 Claims, 6 Drawing Sheets

(56) References Cited

U.S. PATENT DOCUMENTS

| | | | |
|---|---|---|---|
| 7,254,806 B1* | 8/2007 | Yates et al. | 717/136 |
| 7,516,453 B1 | 4/2009 | Bugnion | |
| 7,624,390 B2* | 11/2009 | Asao | 717/159 |
| 7,747,991 B2* | 6/2010 | Tanaka | 717/152 |
| 7,941,641 B1 | 5/2011 | Jung | |
| 8,099,724 B2* | 1/2012 | Plummer | 717/151 |
| 8,255,882 B2* | 8/2012 | Zhang et al. | 717/136 |
| 8,266,604 B2* | 9/2012 | Groff et al. | 717/146 |
| 8,307,360 B2* | 11/2012 | Serebrin | 718/1 |
| 8,321,849 B2* | 11/2012 | Nickolls et al. | 717/146 |
| 8,352,925 B2* | 1/2013 | Russell et al. | 717/136 |
| 2002/0032718 A1* | 3/2002 | Yates et al. | 709/107 |
| 2003/0005103 A1* | 1/2003 | Narad et al. | 709/223 |
| 2003/0101334 A1* | 5/2003 | Desoli | 712/227 |
| 2004/0073893 A1* | 4/2004 | Rajaram et al. | 717/136 |
| 2004/0098707 A1* | 5/2004 | Tang et al. | 717/130 |
| 2004/0117532 A1* | 6/2004 | Bennett et al. | 710/260 |
| 2005/0015754 A1* | 1/2005 | Werner et al. | 717/136 |
| 2005/0097530 A1* | 5/2005 | Asao et al. | 717/140 |
| 2005/0216701 A1 | 9/2005 | Taylor | |
| 2006/0123198 A1* | 6/2006 | Asao | 711/137 |
| 2006/0130014 A1* | 6/2006 | Tanaka | 717/136 |
| 2006/0277405 A1* | 12/2006 | Bowler et al. | 713/100 |
| 2007/0038844 A1* | 2/2007 | Valentine et al. | 712/219 |
| 2007/0079304 A1 | 4/2007 | Zheng et al. | |
| 2007/0234311 A1* | 10/2007 | Plummer | 717/136 |
| 2008/0141011 A1* | 6/2008 | Zhang et al. | 712/226 |
| 2008/0184211 A1* | 7/2008 | Nickolls et al. | 717/140 |
| 2008/0282260 A1* | 11/2008 | Bozza et al. | 719/315 |
| 2009/0094586 A1* | 4/2009 | Brown et al. | 717/136 |
| 2009/0150869 A1 | 6/2009 | Fong et al. | |
| 2009/0172713 A1* | 7/2009 | Kim et al. | 719/331 |
| 2009/0187750 A1* | 7/2009 | Bugnion | 712/244 |
| 2009/0187902 A1* | 7/2009 | Serebrin | 718/1 |
| 2009/0204785 A1* | 8/2009 | Yates et al. | 711/205 |
| 2010/0050165 A1* | 2/2010 | Chen et al. | 717/162 |
| 2010/0191937 A1* | 7/2010 | Hickey et al. | 712/208 |
| 2010/0223603 A1* | 9/2010 | Linden | 717/140 |
| 2012/0089976 A1 | 4/2012 | Ma et al. | |
| 2012/0151184 A1* | 6/2012 | Wilkerson et al. | 712/36 |
| 2012/0159481 A1* | 6/2012 | Anderson et al. | 718/1 |
| 2012/0254593 A1* | 10/2012 | San Adrian et al. | 712/205 |
| 2013/0073883 A1* | 3/2013 | Vick et al. | 713/320 |
| 2013/0096908 A1* | 4/2013 | Cook et al. | 703/26 |
| 2013/0151824 A1* | 6/2013 | Bugnion | 712/244 |
| 2013/0254556 A1* | 9/2013 | Kamei | 713/189 |
| 2013/0283017 A1* | 10/2013 | Wilkerson et al. | 712/225 |

OTHER PUBLICATIONS

International Search Report and Written Opinion mailed Oct. 25, 2012 for International Application No. PCT/CN2012/070163, 10 pages.

* cited by examiner

ISA BRIDGING INCLUDING SUPPORT FOR CALL TO OVERIDDING VIRTUAL FUNCTIONS

RELATED APPLICATION

This present application claims priority under 35 U.S.C. §§119 and 365(a) to International Application No. PCT/CN2012/079798, filed Aug. 8, 2012, entitled "ISA BRIDGING INCLUDING SUPPORT FOR CALL TO OVERIDDING VIRTUAL FUNCTIONS," which designated the United States of America and at least one country other than the United States. The entire contents of International Application No. PCT/CN2012/079798 is hereby incorporated by reference in its entirety.

This application is technically related to Patent Cooperation Treaty Application No.: PCT/CN2012/070163, filed Jan. 10, 2012, entitled "ISA Bridging with Callback," which designated the United States of America and at least one country other than the United States.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computing device may be characterized by its Instruction Set Architecture (ISA). Typically, a computing device may include Operating System (OS) services, and the OS services may include the runtime library services (LIB), developed for the ISA of the computing device, to facilitate application developers to develop applications to operate on the computing device. For example, various smartphones may be characterized by the use of the ARM processor and its ISA. These smartphones may include an OS, e.g., iOS or Android, in support of the various applications developed for the respective smartphones. Some computing devices offer an ISA-independent execution environment, such as Java™ or Android Application Framework. However, a large number of applications nonetheless include ISA dependent portions that invoke services of ISA-dependent runtime libraries. Further, these ISA dependent portions often include callback functions requiring callbacks from the ISA-dependent runtime libraries, and such callbacks are often not discovered until runtime, rendering traditional approaches, such as binary translation, inadequate in addressing the needs. Additionally, these ISA dependent portions may also include overriding implementations of inheritable virtual functions of the ISA-dependent runtime libraries that need to be properly called when the virtual functions are called. The traditional approaches, such as binary translation, are likewise inadequate in addressing the needs.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with ISA bridging with callback and virtual function support are disclosed. In various embodiments, at least one computer-readable storage medium may include instructions configured to enable a target device with a target ISA, in response to execution of the instructions, to provide an ISA bridging layer to the target device to facilitate a library service of a library of the target device to call a virtual function of the library, while servicing an application. The library service may be implemented for the target ISA, and the application may be implemented at least partially for a source ISA that may be different from the target ISA, and includes a class with an overriding implementation of the virtual function. The ISA bridging layer may include a loader configured to load the application for execution, and as part of the loading, detect the virtual function, and modify a virtual function table of the application to enable, in response to the call, execution control be transferred across the source and target instruction set architectures to the overriding implementation of the virtual function. The ISA bridging layer, in embodiments, may further include a source ISA emulator and a library emulator configured to cooperate to enable the execution control transfer, in response to the call, as well as the application to call the library service, and the library service to callback the callback function, across the ISAs.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
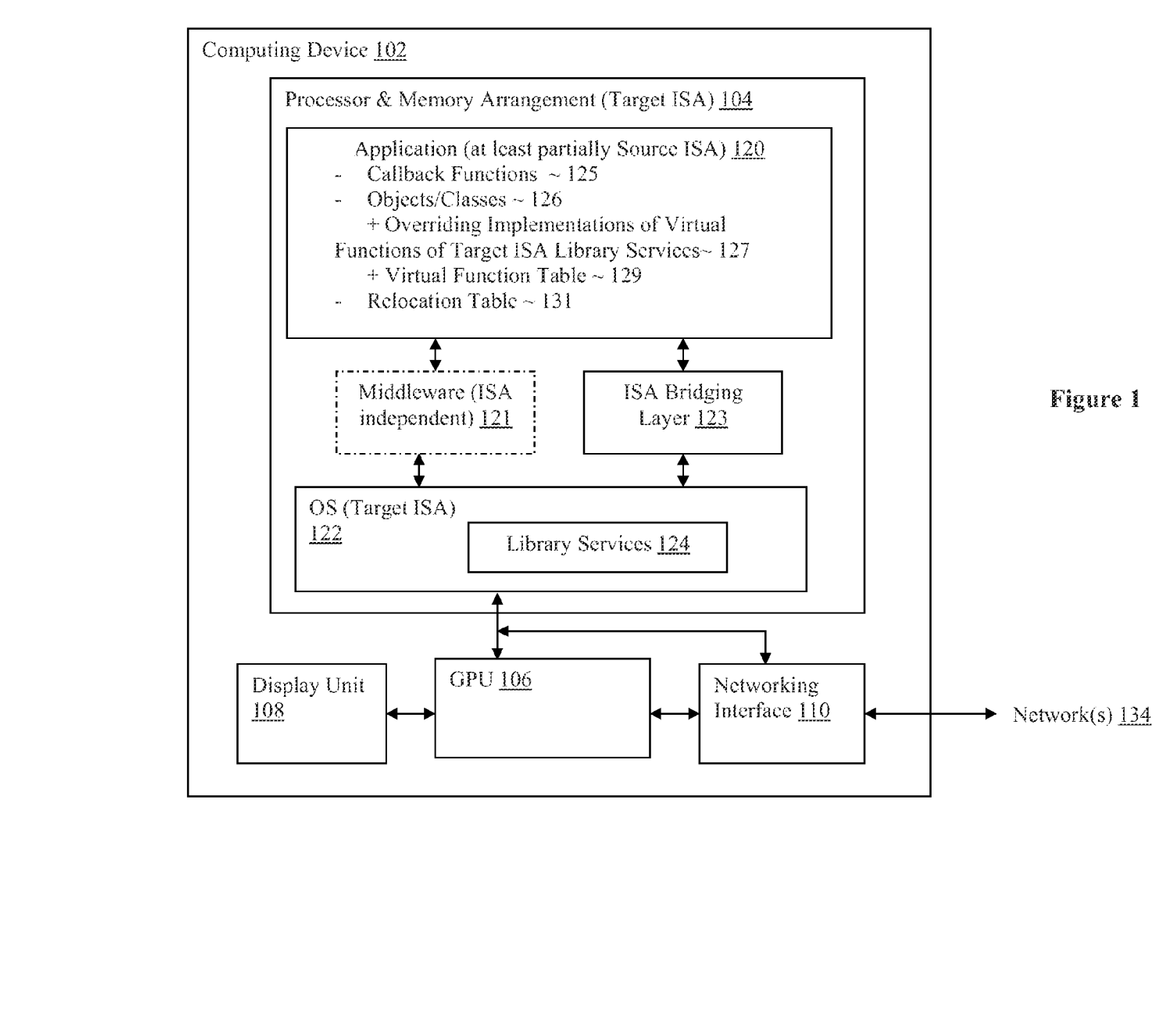
FIG. 1 illustrates an example computing device incorporated with ISA bridging with callback and virtual function support.

FIG. 1 illustrates an example computing device incorporated with ISA bridging with callback and virtual function support, in accordance with various embodiments of the present disclosure. As shown, for the illustrated embodiments, computing device 102 may include processor and memory arrangement 104 configured to have operating system (OS) 122, ISA bridging layer 123, and application 120 operated therein, graphics processing unit (GPU) 106, display unit 108, and networking interface 110, coupled with each other as shown. OS 122 may include a library of services 124. Additionally, computing device 102 may also include optional middleware 121 between application 120 and OS 122. As will be described in more detail below, ISA bridging layer 123 may be configured with various application load and runtime features or services (including, but are not limited to, e.g., dynamic binding) to enable application 120 to be implemented in a source ISA in whole or in part (e.g., when an ISA-independent middleware 121 is also used), while OS 122 (including library services 124) may be implemented in a target ISA that is different from the source ISA. Further, application 120 may be an application (in particular, the portion implemented using source ISA) that includes usage characteristics of library services 124 that require various ones of library services 124 to callback various callback functions 125 of application 120, under various conditions.

In embodiments, application 120 may be object oriented or include classes 126. For these embodiments, application 120 may include objects/classes 126 with one or more overriding implementations of virtual functions 127 inherited from target ISA library services 124. Additionally, application 120 may include one or more virtual function tables 129 for storing these overriding implementations of the virtual functions 127 inherited from the target ISA library services 124 (hereinafter, simply overriding implementations 127). The one or more virtual function tables 129 may further include associated metadata describing the overriding implementations 127. In embodiments, application 120 may further include a relocation table 131 containing symbol names and other information that facilitate runtime resolution of the portions unresolved at compile time.

In embodiments, ISA bridging layer 123 may include support for execution control to be properly transferred across the different ISA to these overriding implementations 127 when various ones of library services 124 call the virtual function. Various embodiments of ISA bridging layer 123 will be further described below. ISA bridging layer 123 may also be referred to as a process virtual machine (PVM).

Computing device 102 may be a server, a desktop computer, a laptop computer, a tablet computer, a smartphone, a personal digital assistant, a game console, an Internet appliance, or other computing devices of the like. Examples of computing device 102 may include, but are not limited to, the servers available from Hewlett Packard of Palo Alto, Calif., desktop or laptop computers available from Dell Computer of Austin, Tex., smartphones and computing tablets available from Apple Computer of Cupertino, Calif., game console available from Nintendo Corporation of Tokyo, Japan, and so forth.

Processor and memory arrangement 104 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth. In various embodiments, GPU 106 may be configured to provide video decoding and/or graphics processing functions to OS 122, while display unit 108 may be configured to enable multimedia content, e.g., HD video, to be rendered thereon. Similarly, GPU 106 and display unit 108 are intended to represent a broad range of graphics processors and display elements known in the art. Likewise, network(s) 134 is (are) intended to represent a broad range of networks known in the art. Examples of network(s) 134 may include wired or wireless, local or wide area, private or public networks, including the Internet.

OS 122 (including library services 124), except for the application programming interface (API) defining invocation of library service 124, is intended to represent a broad range of operating system elements known in the art. OS 122 may include conventional components such as a kernel configured to manage memory resources, schedule task execution, and so forth, and device drivers configured to manage various device resources. In embodiments, OS 122 may include a virtual machine in support of middleware 121 (if employed), e.g., Android's virtual machine in support of the Android application framework. For the embodiments, in addition to defining invocations of library services 124, to facilitate invocation of callback functions 125 of application 120, the API of library services 124 may also include the corresponding stubs and signatures of callback functions 125 of application 120. Examples of OS 122 may include, but are not limited to Windows® operating systems, available from Microsoft Corporation of Redmond, Wash., Linux, available from e.g., Red Hat® of Raleigh, N.C., Android™, developed by the Open Handset Alliance, or iOS, available from Apple® Computer of Cupertino, Calif.

Similarly, middleware 121 is intended to represent a broad range of middleware elements known in the art including, but not limited to, ISA-independent middleware. Examples of middleware 121 may include, but are not limited to, Android Application Framework, Java™, or other application frameworks or ISA-independent execution environments.

Likewise, application 120 (including callback functions 125, overriding implementations 127, etc) is intended to represent a broad range of applications known in the art. Examples of application 120 may include, but are not limited to, personal assistant, productivity, or social networking applications, such as, calendar, word processing, spreadsheet, Twitter, Facebook, et al, or generic application agents, such as a browser. Examples of a browser may include, but are not limited to, Internet Explorer, available from Microsoft Corporation of Redmond, Wash., or Firefox, available from Mozilla of Mountain View, Calif.

Figure 2:
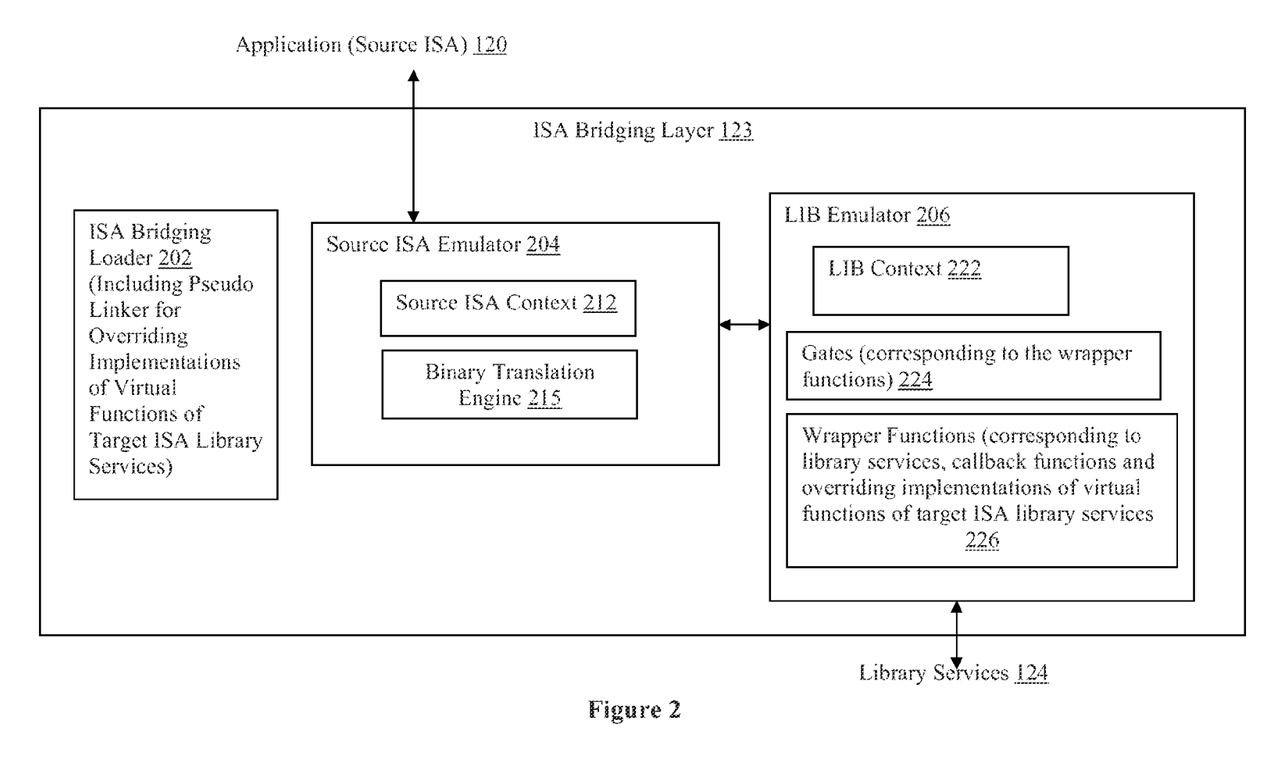
FIG. 2 illustrates ISA bridging layer of FIG. 1 in further detail.

Referring now to FIG. 2, wherein illustrated is an example ISA bridging layer 123, in accordance with various embodiments of the present disclosure. As shown, for the embodiments, ISA bridging layer 123 may include ISA bridging loader 202, source ISA emulator 204 and target ISA Library emulator 206 (hereinafter, simply LIB emulator), configured to provide various runtime features and services including, but not limited to, dynamic binding services. Source ISA emulator 204 may include source ISA context 212, and binary translation engine 215. Source ISA emulator 204 may maintain in source ISA context 212, the execution context of source ISA architecture including, but not limited to, e.g., the current execution instruction pointer (IP). Binary translator engine 215 may be configured to translate source ISA instructions to target ISA instructions. LIB emulator 206 may include target ISA Library (LIB) context 222, gates 224 and wrapper functions 226. LIB emulator 206 may maintain in target ISA Library (LIB) context 222, the execution context of target ISA Library. In various embodiments, there may also be one corresponding pair of gate 224 and wrapper function 226 per library service 124, configured to facilitate calling of library service 124 by application 120, across the source and target ISA architectures. Similarly, there may be one corresponding pair of gate 224 and wrapper function 226 per callback function 125 and per overriding implementations 127, configured to facilitate callback of callback function 125 by library services 124, across the target and source ISA architectures, and transfer of execution control to the overriding implementations 127, across the target and source ISA architectures, when the virtual functions are called.

ISA bridging loader 202 may be configured to load application 120. In loading application 120, ISA bridging loader 202 may be configured to resolve any unresolved symbolic names of application 120 associated with calling library services to appropriate ones of the library services 124. In embodiments, ISA bridging loader 202 may be configured to resolve any unresolved symbolic names of application 120 associated with calling library services to addresses of the corresponding gates 224 of library services 124. Additionally, ISA bridging loader 202 may be configured to modify the symbolic names or references to callback functions 125 to internal names, and associate the symbolic names or references to callback functions 125 to the corresponding wrapper functions 226.

Further, ISA bridging loader 202 may further include pseudo linker functions configured to resolve the various overriding implementations 127 when loading application 120 for execution. ISA bridging loader 202, in embodiments, as part of the loading, may identify overriding implementations 127, using information in relocation table 131. ISA bridging loader 202, in embodiments, may be further configured to make possible for execution control to be transferred across the ISA to overriding implementations 127, if appropriate, when library services 124 call the virtual functions, by modifying virtual function tables 129, replacing entries in virtual function tables 129 with corresponding wrapper functions. In embodiments, the wrapper functions may include pointers to the overriding implementations 127.

ISA bridging loader 202 may gain control of the loading from the loader of OS 122 (or middleware 121, if employed) in any one of a number of known manners. Examples of such known manners may include the use of binary format based control transfer or load/pre-load variables when supported by OS 122 or middleware 121. In other embodiments, the loader of OS 122 (or middleware 121, if employed) may be modified to facilitate the transfer of control to ISA bridging loader 202 instead.

As described earlier, source ISA emulator 204 may be configured to maintain source ISA execution context 212. Source ISA emulator 204 may be configured to track the source ISA IP (instruction pointer) during execution of application 120. When application 120 attempts to invoke a library service 124, source ISA emulator 204 monitoring source ISA execution may invoke and transfer execution control to LIB emulator 206 instead. In various embodiments, source ISA emulator 204 may invoke and transfer execution control to the corresponding gate 224 of the library service 124.

LIB emulator 206 may likewise be configured to maintain target ISA library (LIB) execution context 222.

Gates 224 corresponding to library services 124 may be configured to respectively redirect calls to library services 124 to the corresponding wrapper functions 226 to process and set up the calls. Whereas gates 224 corresponding to callback functions 125 or overriding implementations 127 may be configured to respectively transfer execution control for callbacks or calls to the virtual functions, from the corresponding wrapper functions 226 to source ISA emulator 204. In various embodiments, each gate 224 may include an instruction configured to effectuate the redirect to the corresponding wrapper function 226 or source ISA emulator 204. In various embodiments, the instruction of each gate 224 may be a source ISA instruction configured to cooperate with the binary translation engine 215 to effectuate execution control redirection. In various embodiments, each gate 224 may further include an indicator identifying the corresponding wrapper function 226.

In various embodiments, for processing and setting up a call to the corresponding library service 124, each wrapper function 226 corresponding to a library service 124 may be configured to retrieve the associated parameter values of the call from source ISA context 212, convert the call from the source ISA application binary interface (ABI) format to the target ISA ABI format, and save the converted call with the parameter values in LIB context 222.

On a callback to a callback function 125, or a call to an overridden virtual function, execution control may be transferred to the corresponding wrapper function 226 of callback function 125 or overriding implementations 127. In various embodiments, for processing and setting up a callback to a callback function 125 or transfer of execution control to overriding implementation 127 of application 120, each wrapper function 226 corresponding to a callback function 125 or an overriding implementation 127 may be configured to convert the callback or call to the overridden virtual function from the target ISA ABI format to the source ISA ABI format, attach the associated parameter values of the callback or call to the overridden virtual function, and save the converted callback or call to the overridden virtual function with the parameter values in source ISA context 212.

Gates 224 corresponding to a callback function 125 or an overriding implementation 127 may be configured to invoke the source ISA emulator 204 with the source ISA context prepared by wrapper function 226 corresponding to the callback function 125 or overriding implementation 127 to emulate the callback function 125 or overriding implementation 127 presented in Source ISA format on target ISA.

Figure 3:
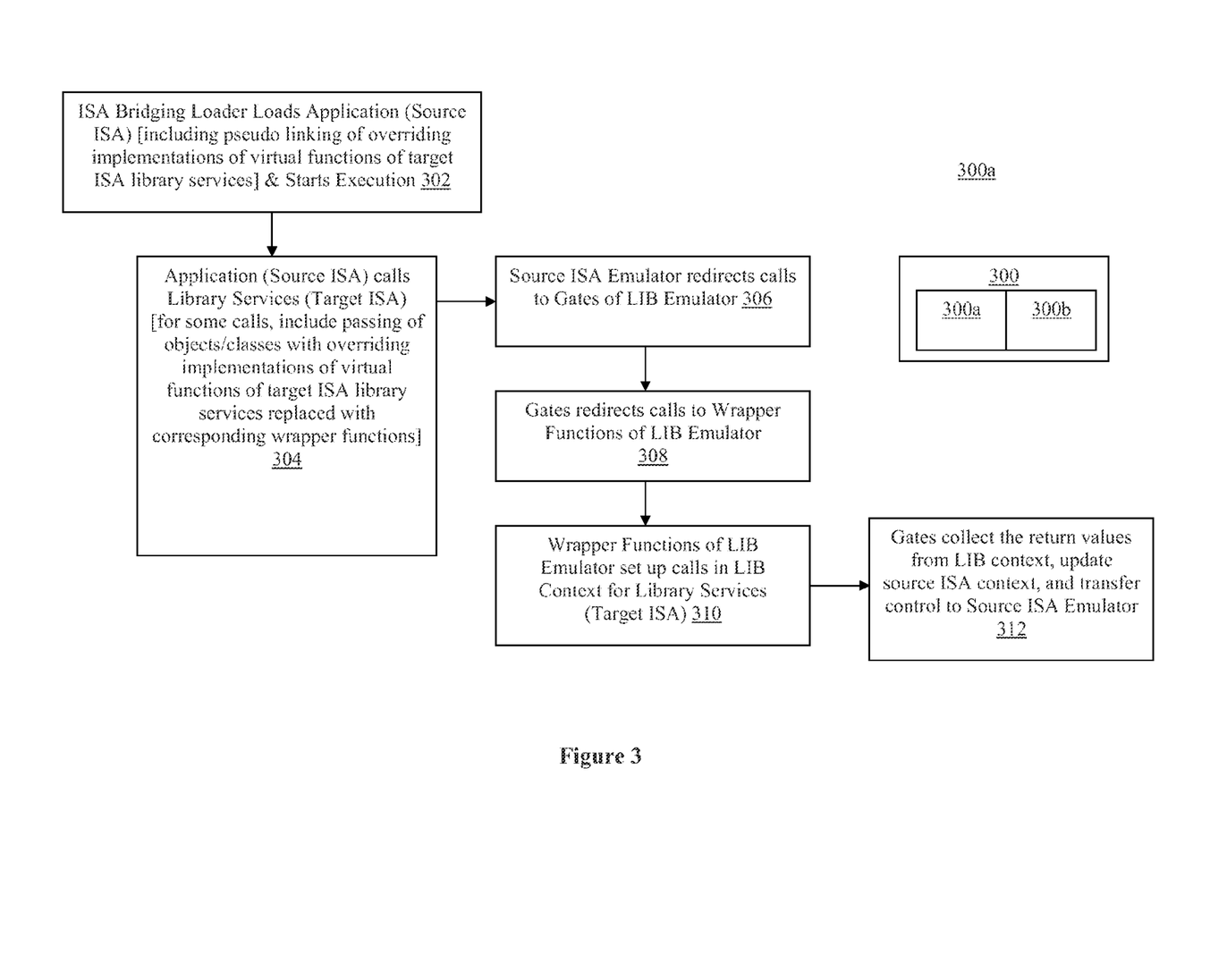
FIGS. 3 and 4 illustrate methods for bridging calls and callbacks between an application of a source ISA and library services of a target ISA.
Figure 4:
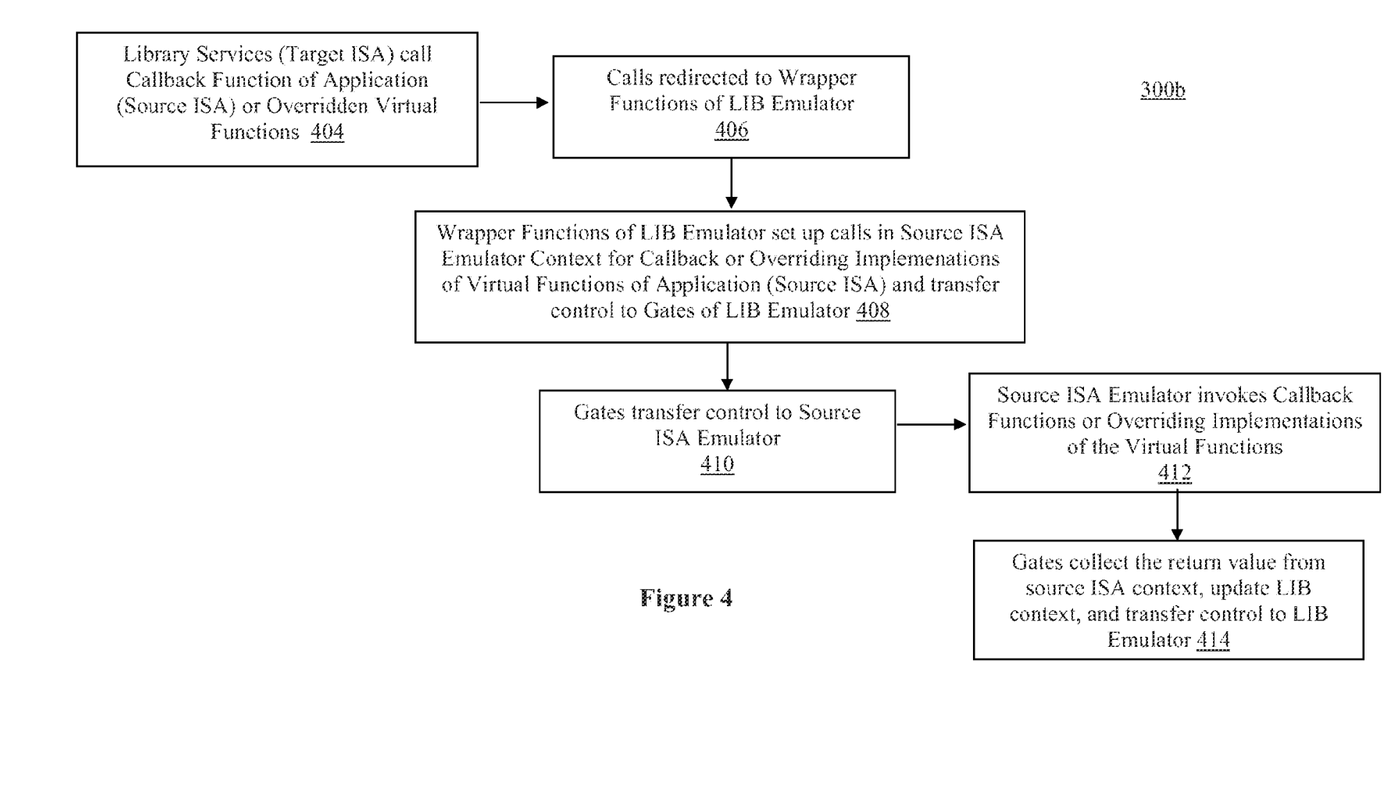

Referring now to FIGS. 3-4, wherein illustrated is an example ISA bridging method with callback and virtual function support, in accordance with various embodiments of the present disclosure. As shown, method 300 may include two parts, part 300a for bridging calls from application 120 (of source ISA) to library services 124 (of target ISA), and part 300b for bridging callbacks from a library service 124 (of target ISA) to a callback function of application 120 (of source ISA) or proper transfer of execution control to an overriding implementation 127.

Part 300a may begin at block 302. At block 302, ISA bridging loader 202 may load application 120. In loading application 120, ISA bridging loader 202 may resolve the symbolic names or references of application 120 to library services 124, and modify symbolic names or references of callback functions 125. Further, ISA bridging loader 202 may detect/identify overriding implementations 127, using relocation table 131 and modify virtual function tables 129, as earlier described. The process is illustrated in further details in FIG. 6.

Figure 6:
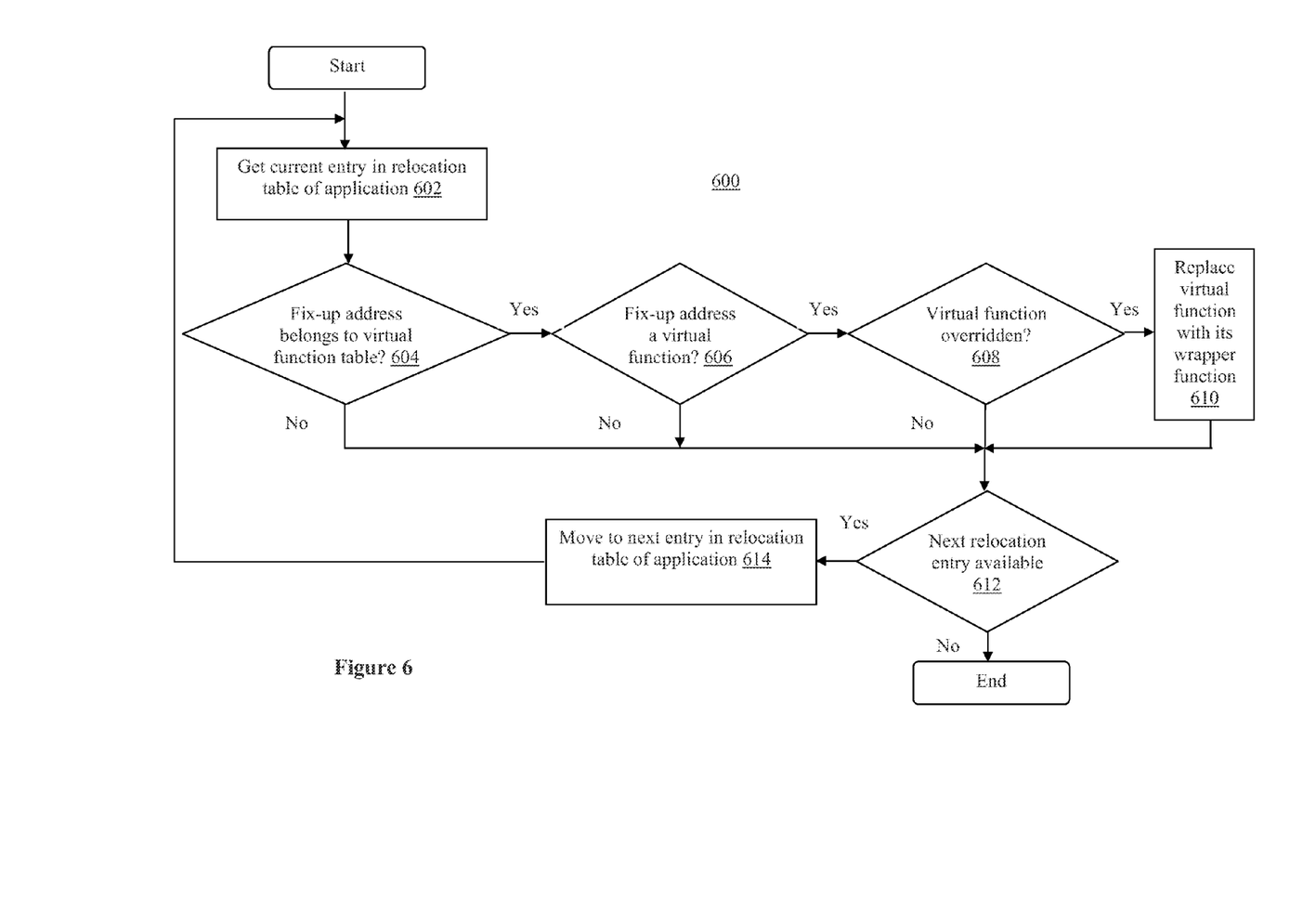
FIG. 6 illustrates an example process associated with replacing an entry in a virtual function table with a wrapper function that includes a pointer to an overriding implementation.

Referring now to FIG. 6, as illustrated, process 600 may start at block 602. At block 602, loader 202 may retrieve the current entry in relocation table 131. From block 602, process 600 may proceed to block 604. At block 604, loader 202 may determine if the fix-up address in the retrieved entry belongs to a virtual function table 129. If a result of the determination is affirmative, process 600 may proceed to block 606. At block 606, loader 202 may further determine if the fix-up address is associated with a virtual function. If a result of the determination is affirmative, process 600 may proceed to block 608. At block 608, loader 202 may further determine if the virtual function has been overridden. If a result of the determination is again affirmative, process 600 may proceed to block 610. At block 610, loader 202 may replace the entry in the virtual function table 129 with a corresponding wrapper function that includes a pointer to the overriding implementation 127.

If a result of the determination in block 604, 606 or 608 is negative, process 600 may proceed to block 612. At block 612, loader 202 may determine if another entry in relocation table 131 is available. If a result of the determination is affirmative, process 600 may proceed to block 614. At block 614, loader 202 may move to the next entry in relocation table 131. From block 614, process 600 may proceed to block 602, and repeat the process as earlier described.

If a result of the determination at block 612 is negative, process 600 may end.

Referring now back to FIG. 3, from block 302, part 300a may proceed to block 304. At block 304, in the course of execution, application 120 may call one of library services 124. In various embodiments, application 120 may require a callback to one of its callback functions 125 by the called library service 124. In embodiments, application 120 may include as part of the call to the called library service 124 a pointer to the callback function 125 to be callback. Instead of passing the pointer to the callback function 125, the wrapper function 226 of the library service 124 may pass the corresponding wrapper function 226 of the call back function 125.

For some calls, objects/classes 126 with overriding implementations 127 and virtual function tables 129 modified as earlier described may be passed to the library having library services 124.

From block 304, part 300a may proceed to block 306. At block 306, source ISA emulator 204, on detection of the call through e.g., monitoring of the source ISA IP and determining that the IP is referencing an address within the address scope of the target library, may redirect the call and transfer execution control to the corresponding gate 224 of the library service 124 in LIB emulator 206. From block 306, part 300a may proceed to block 308. At block 308, gate 224 may further redirect the call and transfer execution control to the corresponding wrapper function 226 of the called library service 124. From block 308, part 300a may proceed to block 310. At block 310, wrapper function 226 of the called library service 124 may process the call, and set up the call in LIB context 222 for execution by the called library service 124, as earlier described. From block 310, part 300a may proceed to block 312. At block 312, gate 224 of the called library service 124 may collect the return value(s) of the call from LIB context 222, update source ISA context 212, and transfer execution control to source ISA emulator 202 to return the return values of the library service call to application 125.

Referring now to FIG. 4, part 300b may begin at block 404. At block 404, in the course or on completion of a called library service 124, the library service 124 may callback a callback function 125 of application 120, e.g., by calling the callback pointer passed by application 120, or call a virtual function of the library that has been overridden by an implementation of application 120. From block 404, part 300b may proceed to block 406, as the callback/call pointer is the wrapper function 226 corresponding to the callback function 125 or overriding implementation 127. At block 406, execution control may be transferred to the corresponding wrapper function 226 of callback function 125 or overriding implementation 127, in accordance with the modified reference. From block 406, part 300b may proceed to block 408. At block 408, wrapper function 226 may process the callback/call, set up the callback/call in source ISA context 212 for execution by the callback function 125 or overriding implementation 127 of application 120, as described earlier, and thereafter, transfer execution control to the corresponding gate 224 of the callback function 125 or overriding implementation 127. From block 408, part 300b may proceed to block 410. At block 410, gate 224 corresponding to the callback function 125 or overriding implementation 127 may redirect the callback/call and transfer execution control to the ISA emulator with the source ISA context prepared by the wrapper function 226.

Further, at block 412, on detection of the call through, e.g., monitoring of the source ISA IP and determining that the IP is referencing an address within the address scope of the gates 224 corresponding to callback functions 125 or overriding implementation 127, source ISA emulator 204 may redirect the source ISA IP to the callback function 125 or overriding implementation 127 to continue the emulation. From block 412, part 300b may proceed to block 414. At block 414, gate 224 of the callback function 125 or overriding implementation 127 may collect the return value(s) of the callback or call from source ISA context 212, update LIB context 222, and transfer execution control to LIB emulator 206 to return the return values of the callback function 125 or overriding implementation 127 to the library service 124.

Figure 5:
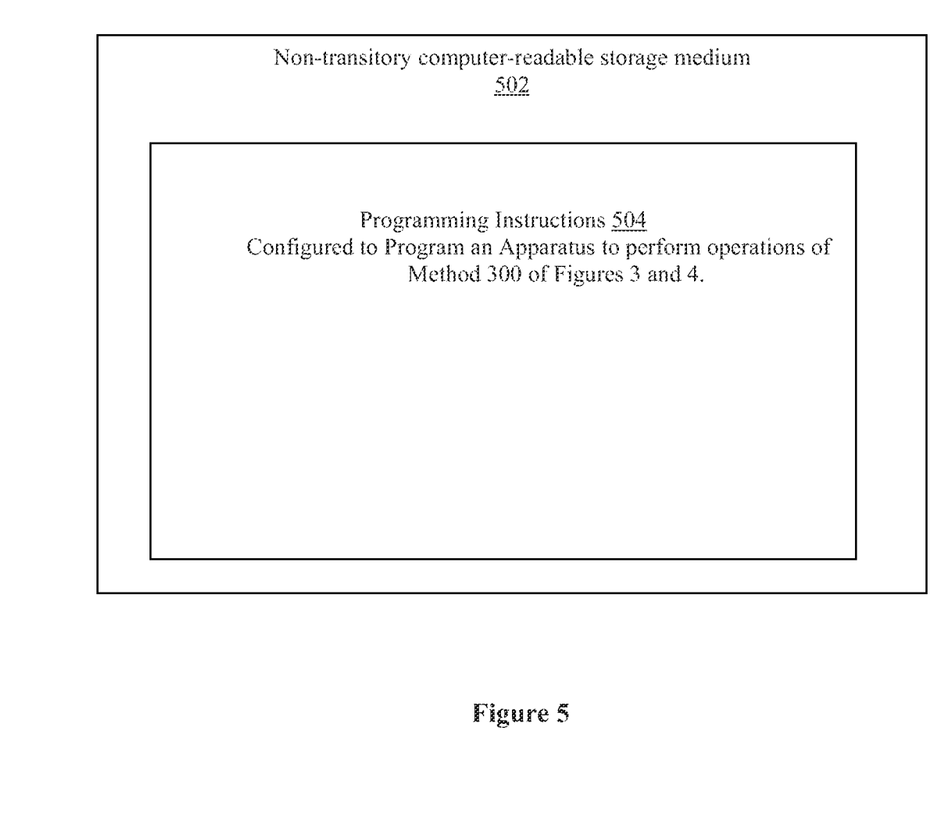
FIG. 5 illustrates an example non-transitory computer-readable storage medium having instructions configured to practice all or selected aspects of the method of FIGS. 3 and 4; all arranged in accordance with embodiments of the present disclosure.

FIG. 5 illustrates an example non-transitory computer-readable storage medium having instructions configured to practice all or selected aspects of the method of FIGS. 3 and 4 in accordance with various embodiments of the present disclosure. As illustrated, non-transitory computer-readable storage medium 502 may include a number of programming instructions 504. Programming instructions 504 may be configured to enable a computing device, e.g. computing device 102, in response to execution of the programming instructions, to perform all or selected aspects of the ISA bridging operations of method 300 earlier described with references to FIGS. 3 and 4. In alternate embodiments, programming instructions 504 may be disposed on multiple non-transitory computer-readable storage media 502.

Referring back to FIG. 1, for one embodiment, at least one of the processor(s) of processor and memory arrangement 104 may be packaged together with the computational logic (or a subset thereof) of ISA bridging layer 123 configured to practice the operations (or a subset thereof) of method 300 of FIGS. 3 and 4. For one embodiment, at least one of the processor(s) of processor and memory arrangement 104 may be packaged together with the computational logic (or a subset thereof) of ISA bridging layer 123 configured to practice the operations (or a subset thereof) of method 300 of FIGS. 3 and 4 to form a System in Package (SiP). For one embodiment, at least one of the processor(s) of processor and memory arrangement 104 may be integrated on the same die with the computational logic (or a subset thereof) of ISA bridging layer 123 configured to practice the operations (or a subset thereof) of method 300 of FIGS. 3 and 4. For one embodiment, at least one of the processor(s) of processor and memory arrangement 104 may be integrated on the same die with the computational logic (or a subset thereof) of ISA bridging layer 123 configured to practice the operations (or a subset thereof) of method 300 of FIGS. 3 and 4 to form a System on Chip (SoC). For at least one embodiment, the SoC may be utilized in a desktop computer, a laptop computer, a smartphone, a computing tablet, an Internet appliance, a personal digital assistant (PDA), a portable game playing device, a server or other computing devices.

Still referring to FIG. 1, while for ease of understanding, the present disclosure has been described with one ISA bridging layer 123 bridging one source ISA to one target ISA. However, the present disclosure is not so limited. In embodiments, multiple different ISA bridging layers 123 may be provided to bridge multiple different source ISA to the target ISA. In some of these embodiments, a dispatcher may additionally be provided to detect the bridging required, and instantiates the appropriate ISA bridging layer or layers 123 to provide the required ISA bridging.

Further, in various embodiments, the present disclosure may be practiced with substituted binaries (in target ISA) for portions of application 120 (in source ISA) to reduce the amount of bridging needed. In other embodiments, some of the resources used for bridging, e.g., some of the wrapper functions, may be located on a remote server accessible to ISA bridging layer 123.

Still further, while for ease of understanding, ISA bridging layer 123 has been described as being configured to bridge source ISA and target ISA that are different. However, the disclosure is not so limited. It is contemplated that for various applications, ISA bridging layer 123 may be employed to bridge source ISA and target ISA that are the same. In such applications, one or more of the described elements, e.g., binary translation engine 215, may not be needed. An example of such application may be to provide enhanced operational security to computing device 102. Other applications may likewise benefit from such bridging.

Thus, although specific embodiments have been illustrated and described herein, it will be appreciated by those of ordinary skill in the art that a wide variety of alternate and/or equivalent implementations may be substituted for the specific embodiments shown and described.

Accordingly, it will be appreciated that the present disclosure may be a solution to the technical problem of a computing device with one ISA supporting applications developed for another ISA where the applications have usage characteristics of requiring, on occasions, callbacks from the called library services or calls to virtual functions of the library with overriding implementations by the application. The advantage of the present disclosure may include, but is not limited to, avoiding the need to fully translate or re-implement the application in the computing device's ISA.

It will also be appreciated that the present disclosure may be a solution to the technical problem of providing enhanced security to a computing device. The advantage of the present disclosure may include, but is not limited to, the robustness of the isolation provided.

In particular, what has been disclosed include, but not limited to, at least one computer-readable storage medium having instructions configured to enable a target device with a target instruction set architecture, in response to execution of the instructions, to provide an instruction set architecture bridging layer to the target device to facilitate a library service of a library of the target device to call a virtual function of the library, while servicing an application operating on the target device. The library service may be implemented for the target instruction set architecture, and the application may be implemented at least partially for a source instruction set architecture and includes a class with an overriding implementation of the virtual function. Further, the instruction set architecture bridging layer may include a loader configured to load the application for execution, and as part of loading the application, detect the overriding implementation of the virtual function and modify a virtual function table of the class to enable, in response to the call, execution control be transferred across the source and target instruction set architectures to the overriding implementation of the virtual function.

In embodiments, the loader may be configured to traverse a relocation table of the application to detect the overriding implementation of the virtual function. In embodiments, the loader may be configured to modify the virtual function table to replace the overriding implementation of the virtual function with a corresponding wrapper function of the overriding implementation of the virtual function that includes a pointer to the overriding implementation of the virtual function.

In embodiments, the instruction set architecture bridging layer may further include a source instruction set architecture emulator and a library emulator configured to cooperate to facilitate the transfer of execution control across the source and target instruction set architectures to the overriding implementation of the virtual function, including facilitation of transfer of the class across the source and target instruction set architectures to the library.

In embodiments, the source instruction set emulator may be configured to maintain an execution context of the source instruction set architecture, and the library emulator is configured to maintain a library execution context. The library emulator may be further configured to redirect the call to the corresponding wrapper function of the overriding implementation of the virtual function, to process the call, set up the call in the execution context of the source instruction set architecture, and redirect the call to a corresponding gate. Additionally, the library emulator may include the corresponding gate, configured to redirect the call to the source ISA instruction emulator. The source ISA instruction emulator may be further configured to redirect the call to the overriding implementation of the virtual function. The source instruction set architecture and the target instruction set architecture may be the same instruction set architecture.

Further, a method for bridging a source instruction set architecture to a target instruction set architecture with virtual function support has been disclosed. The method may include loading an application for execution, by a loader of an instruction set architecture bridging layer operated by a computing device, wherein the application is implemented at least partially for a source instruction set architecture, including at least a class having an overriding implementation of a virtual function of a library of the computing device, and wherein the computing device implements the target instruction set architecture. Additionally, the method may include, as part of the loading, detecting, by the loader, the overriding implementation of the virtual function, and modifying, by the loader, a virtual function table of the class to enable execution control be transferred across the source and target instruction set architectures to the overriding implementation of the virtual function, in response to a library service of the library calling the virtual function, upon passing the class to the library after modification.

In embodiments, detecting may include traversing, by the loader, a relocation table of the application to detect the overriding implementation of the virtual function. Modifying may include modifying the virtual function table to replace the overriding implementation of the virtual function with a corresponding wrapper function that includes a pointer to the overriding implementation of the virtual function.

In embodiments, the method may further include maintaining a source ISA architecture execution context, by a source instruction set architecture emulator of the instruction set architecture bridging layer; maintaining a library execution context, by a library emulator of the instruction set architecture bridging layer; and cooperating between the instruction set architecture emulator and the library emulator to facilitate transfer of execution control to the overriding implementation of the virtual function, across the source and target instruction set architectures, in response to a call of the virtual function by a library service of the library, upon passing the class to the library.

In embodiments, the method may further include redirecting, by the library emulator, the call to a wrapper function of the library emulator corresponding to the overriding implementation virtual function, to process the call, and set up the call in the execution context of the source instruction set architecture; redirecting the call to the source ISA instruction emulator, by a gate of the library emulator corresponding to the wrapper function of the overriding implementation of the virtual function; and/or redirecting the call, by the source ISA instruction emulator, to the overriding implementation of the virtual function.

Still further, an apparatus for executing an application implemented at least partially in a source instruction set architecture has been disclosed. The apparatus may include a processor and memory arrangement having a target instruction set architecture; and an instruction set architecture bridging layer, including a loader configured to load an application for execution, the application implemented at least partially for a source instruction set architecture and includes a class having an overriding implementation of a virtual function of a library implemented for the target instruction set architecture. The loader may be configured to, as part of loading the application, detect the overriding implementation of the virtual function and modify a virtual function table of the class to enable execution control be transferred across the source and target instruction set architectures to the overriding implementation of the virtual function, in response to a call of the virtual function by a library service of the library after passing the class to the library.

In embodiments, the loader may be configured to traverse a relocation table of the application to detect the overriding implementation of the virtual function. The loader may be configured to modify the virtual function table to replace the overriding implementation of the virtual function with a corresponding wrapper function that includes a pointer to the implementation of the virtual function. The instruction set architecture bridging layer may further include an instruction source architecture emulator and a library emulator, configured to be operated by the processor and memory to cooperate to effectuate the execution control transfer to the overriding implementation of the virtual function, across the source and target instruction set architectures, in response to the call of the virtual function by the library service, after passing of the class to the library.

In embodiments, the source instruction set emulator may be configured to maintain an execution context of the source instruction set architecture, and the library emulator is configured to maintain a library execution context. The library emulator may further include a wrapper function corresponding to the overriding implementation of the virtual function configured to process the call, set up the call in the execution context of the source instruction set architecture, and redirect the call to a corresponding gate. The library emulator may further include the corresponding gate, configured to redirect the call to the source ISA instruction emulator. The ISA instruction emulator may be further configured to redirect the call to the overriding implementation of the virtual function.

In embodiments, the apparatus may be a selected one of a server, a desktop computer, a laptop computer, a tablet computer, a smartphone, a personal digital assistant, a game console, or an Internet appliance. The processor may be a multi-core processor. The apparatus may include an operating system having the library of services. The apparatus may further include an instruction set architecture independent application execution environment; wherein the application further uses at least one other service of the instruction set architecture independent application execution environment.

What is claimed is:

1. At least one computer-readable non-transitory storage medium comprising:
instructions configured to enable a target device with a target instruction set architecture, in response to execution of the instructions, to provide an instruction set architecture bridging layer to the target device to facilitate a library service of a library of the target device to call a virtual function of the library, while servicing an application operating on the target device;
wherein the library service is implemented for the target instruction set architecture, and the application is implemented at least partially for a source instruction set architecture and includes a class with an overriding implementation of the virtual function; and
wherein the instruction set architecture bridging layer includes a loader configured to load the application for execution, and the loader, as part of loading the application,
detect the overriding implementation of the virtual function, and
modify a virtual function table of the class to enable, in response to the call, execution control be transferred back across the source and target instruction set architectures to the overriding implementation of the virtual function.

2. The at least one computer-readable storage medium of claim 1, wherein the loader is configured to traverse a relocation table of the application to detect the overriding implementation of the virtual function.

3. The at least one computer-readable storage medium of claim 1, wherein the loader is configured to modify the virtual function table to replace the overriding implementation of the virtual function with a corresponding wrapper function of the overriding implementation of the virtual function that includes a pointer to the overriding implementation of the virtual function.

4. The at least one computer-readable storage medium of claim 3, wherein the instruction set architecture bridging layer further includes a source instruction set architecture emulator and a library emulator configured to cooperate to facilitate the transfer of execution control across the source and target instruction set architectures to the overriding implementation of the virtual function, including facilitation of transfer of the class across the source and target instruction set architectures to the library.

5. The at least one computer-readable storage medium of claim 4, wherein the source instruction set emulator is configured to maintain an execution context of the source instruction set architecture, and the library emulator is configured to maintain a library execution context.

6. The at least one computer-readable storage medium of claim 5, wherein the library emulator is further configured to redirect the call to the corresponding wrapper function of the overriding implementation of the virtual function, to process the call, set up the call in the execution context of the source instruction set architecture, and redirect the call to a corresponding gate.

7. The at least one computer-readable storage medium of claim 6, wherein the library emulator further includes the corresponding gate, configured to redirect the call to the source ISA instruction emulator.

8. The at least one computer-readable storage medium of claim 7, wherein the source ISA instruction emulator is further configured to redirect the call to the overriding implementation of the virtual function.

9. The at least one computer-readable storage medium of claim 1, wherein the source instruction set architecture and the target instruction set architecture are the same instruction set architecture.

10. A method for bridging a source instruction set architecture to a target instruction set architecture with virtual function support, comprising:
    loading an application for execution, by a loader of an instruction set architecture bridging layer operated by a computing device, wherein the application is implemented at least partially for a source instruction set architecture, including at least a class having an overriding implementation of a virtual function of a library of the computing device, and wherein the computing device implements the target instruction set architecture; and
    as part of the loading, detecting, by the loader, the overriding implementation of the virtual function, and modifying, by the loader, a virtual function table of the class to enable execution control be transferred back across the source and target instruction set architectures to the overriding implementation of the virtual function, in response to a library service of the library calling the virtual function, upon passing the class to the library after modification.

11. The method of claim 10, wherein detecting comprising traversing, by the loader, a relocation table of the application to detect the overriding implementation of the virtual function.

12. The method of claim 10, wherein modifying comprises modifying the virtual function table to replace the overriding implementation of the virtual function with a corresponding wrapper function that includes a pointer to the overriding implementation of the virtual function.

13. The method of claim 12, further comprising
    maintaining a source ISA architecture execution context, by a source instruction set architecture emulator of the instruction set architecture bridging layer;
    maintaining a library execution context, by a library emulator of the instruction set architecture bridging layer;
    cooperating between the instruction set architecture emulator and the library emulator to facilitate transfer of execution control to the overriding implementation of the virtual function, across the source and target instruction set architectures, in response to a call of the virtual function by a library service of the library, upon passing the class to the library.

14. The method of claim 13, further comprising redirecting, by the library emulator, the call to a wrapper function of the library emulator corresponding to the overriding implementation virtual function, to process the call, and set up the call in the execution context of the source instruction set architecture.

15. The method of claim 14, further comprising redirecting the call to the source ISA instruction emulator, by a gate of the library emulator corresponding to the wrapper function of the overriding implementation of the virtual function.

16. The method of claim 15, wherein further comprising redirecting the call, by the source ISA instruction emulator, to the overriding implementation of the virtual function.

17. The method of claim 10, wherein the source instruction set architecture and the target instruction set architecture are the same instruction set architecture.

18. An apparatus for executing an application implemented at least partially in a source instruction set architecture, the apparatus comprising:
    a processor and memory arrangement having a target instruction set architecture; and
    an instruction set architecture bridging layer, including a loader configured to:
        load an application for execution, the application implemented at least partially for a source instruction set architecture and includes a class having an overriding implementation of a virtual function of a library implemented for the target instruction set architecture, and
    as part of loading the application,
    detect the overriding implementation of the virtual function, and
    modify a virtual function table of the class to enable execution control be transferred back across the source and target instruction set architectures to the overriding implementation of the virtual function, in response to a call of the virtual function by a library service of the library after passing the class to the library.

19. The apparatus of claim 18, wherein the loader is configured to traverse a relocation table of the application to detect the overriding implementation of the virtual function.

20. The apparatus of claim 18, wherein the loader is configured to modify the virtual function table to replace the overriding implementation of the virtual function with a corresponding wrapper function that includes a pointer to the implementation of the virtual function.

21. The apparatus of claim 20, wherein the instruction set architecture bridging layer further comprises an instruction source architecture emulator and a library emulator, configured to be operated by the processor and memory to cooperate to effectuate the execution control transfer to the overriding implementation of the virtual function, across the source and target instruction set architectures, in response to the call of the virtual function by the library service, after passing of the class to the library.

22. The apparatus of claim 21, wherein the source instruction set emulator is configured to maintain an execution context of the source instruction set architecture, and the library emulator is configured to maintain a library execution context.

23. The apparatus of claim 22, wherein the library emulator further includes a wrapper function corresponding to the overriding implementation of the virtual function configured to process the call, set up the call in the execution context of the source instruction set architecture, and redirect the call to a corresponding gate.

24. The apparatus of claim 23, wherein the library emulator further includes the corresponding gate, configured to redirect the call to the source ISA instruction emulator.

25. The apparatus of claim 24, wherein the ISA instruction emulator is further configured to redirect the call to the overriding implementation of the virtual function.

* * * * *

UNITED STATES PATENT AND TRADEMARK OFFICE
CERTIFICATE OF CORRECTION

PATENT NO. : 8,768,682 B2  
APPLICATION NO. : 13/745203  
DATED : July 1, 2014  
INVENTOR(S) : Yong Wu et al.

Page 1 of 1

It is certified that error appears in the above-identified patent and that said Letters Patent is hereby corrected as shown below:

In the Claims

Column 12  
Line 41, "..., execution control be transferred..." should read - ..., execution control to be transferred...

Column 13  
Line 37, "...execution control be transferred..." should read - ...execution control to be transferred...  
Line 43, "...comprising..." should read - ...comprises...

Column 14  
Line 8, "..., wherein further comprising..." should read - ..., further comprising...  
Line 23, "...and includes..." should read - ...and including...  
Line 31, "exeuction control be transferred.." should read - execution control to be transferred..

Signed and Sealed this  
Twenty-second Day of March, 2016

Michelle K. Lee  
*Director of the United States Patent and Trademark Office*